(No Model.) 2 Sheets—Sheet 1.
J. McINTYRE.
PIPE FITTING.
No. 500,412. Patented June 27, 1893.
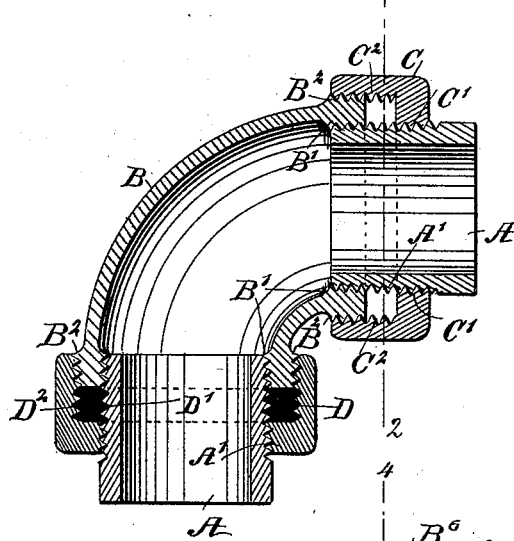
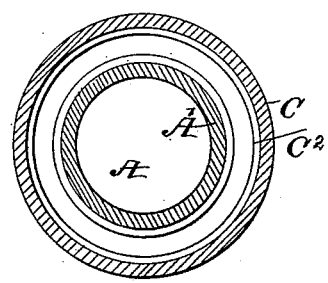
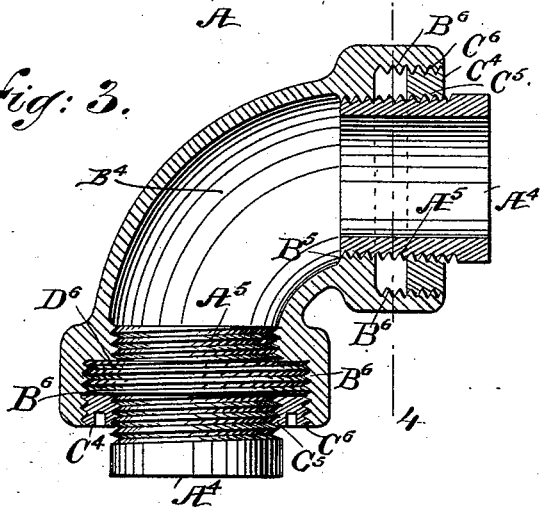
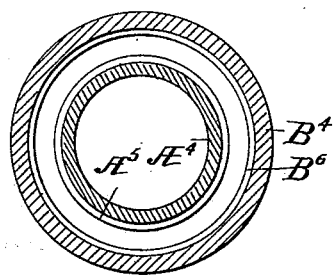
WITNESSES:
Chas. Nida.
C. Sedgwick.
INVENTOR
J. McIntyre
BY
Munn & Co.
ATTORNEYS.

(No Model.) 2 Sheets—Sheet 2.
J. McINTYRE.
PIPE FITTING.
No. 500,412. Patented June 27, 1893.
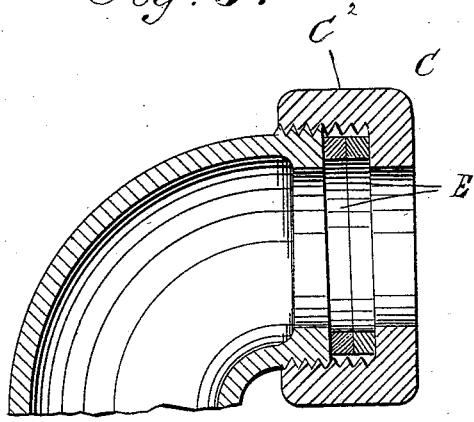
Fig: 5.
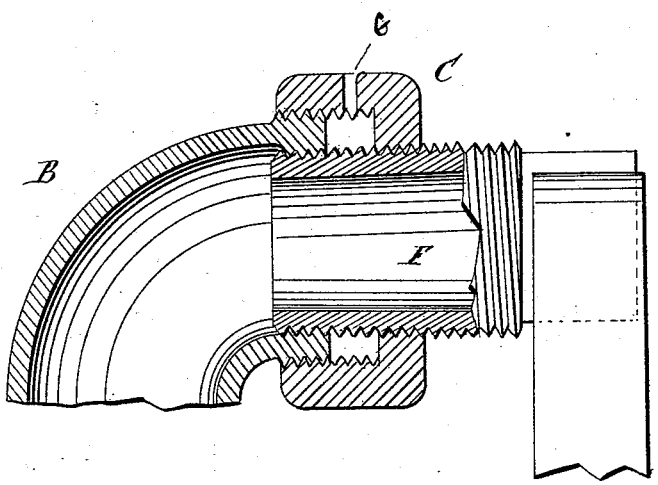
Fig: 6.
WITNESSES:
Chas. Nida
C. Sedgwick
INVENTOR
J. McIntyre
BY Munn & Co
ATTORNEYS.

UNITED STATES PATENT OFFICE.

JOHN McINTYRE, OF JERSEY CITY, NEW JERSEY.

PIPE-FITTING.

SPECIFICATION forming part of Letters Patent No. 500,412, dated June 27, 1893.

Application filed November 21, 1892. Serial No. 452,616. (No model.)

*To all whom it may concern:*

Be it known that I, JOHN MCINTYRE, of Jersey City, in the county of Hudson and State of New Jersey, have invented a new and useful Improvement in Pipe-Fittings, of which the following is a full, clear, and exact description.

The invention consists of a coupling, a follower having a threaded connection with the said coupling and provided with a second thread adapted to be engaged by the pipe to be coupled, and a packing ring having an interior and exterior screw thread and arranged between the coupling and follower so that the latter on being screwed up compresses the packing ring on the said coupling and the pipe to be coupled.

The invention further consists of a compressible packing ring having screw threads engaging simultaneously the screw thread on the follower or the coupling and that of the pipe.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a sectional side elevation of the improvement as arranged on an elbow coupling. Fig. 2 is a transverse section of the same on the line 2—2 in Fig. 1. Fig. 3 is a sectional side elevation of a modified form of the improvement as arranged on an elbow coupling. Fig. 4 is a transverse section of the same on the line 4—4 of Fig. 3. Figs. 5 and 6 are sectional side elevations showing the construction for forming the screw threaded packing ring.

In pipe fittings as heretofore constructed, considerable difficulty has been experienced in forming a complete fluid tight joint, as the packing ring could not be sufficiently and uniformly compressed to render all the parts of the joint tight to prevent leakage.

With the fittings presently to be described in detail, I am enabled to securely connect the pipe with the coupling and to render leakage through the joint impossible.

As illustrated in Figs. 1 and 2, the pipe A is provided at its tapering end with the usual thread $A'$ adapted to engage at its forward end the interior thread $B'$ formed in the elbow or other coupling B. The rear part of the thread $A'$ is engaged by a thread $C'$ formed internally on the recessed follower or nut C also provided with a second thread $C^2$ engaging an exterior second thread $B^2$ on the coupling B. An annular space is formed around the thread $A'$ between the end of the coupling and the inner face of the follower C, the said space occupying about one-third of the length of the thread $A'$, and the threads $C'$ and $B'$ equally sharing the remaining two-thirds. The annular space is filled out by a packing ring D made of a compressible material preferably lead, having an interior thread $D'$ engaging the thread $A'$ and an exterior thread $D^2$ engaging the thread $C^2$ of the follower C. The several threads are of like pitch to fit and to tie the coupling B and the pipe A.

In order to properly tap the coupling B, the follower C and the packing ring D to fit the threaded end of the pipe A, I proceed as follows: The exterior screw thread $B^2$ is first cut on the coupling B, and the screw thread $C^2$ is formed on the follower C and then I place between the end of the elbow coupling B and the follower C, one or two hard metal disks E aggregating the proposed thickness of the packing ring D, and then I screw the follower C onto the elbow coupling B to clamp said disks in place as illustrated in Fig. 5. I then tap as usual by a suitable tool, so that screw threads $C'$ and $B'$ are cut on the follower C and the elbow coupling B respectively. Now, in order to arrange the packing ring in the pipe coupling the follower is unscrewed, the disks are removed and the follower again screwed onto the coupling B. A pipe end F resembling the pipe A is now temporarily and loosely screwed into the elbow coupling B and follower C (see Fig. 6) after which about a quarter turn inward along the pipe end is given to the follower C to slightly enlarge the annular space, and then the molten metal for forming the packing ring D is poured through a pouring hole G in the follower, into the previously mentioned annular space to fill the same. When the metal has sufficiently cooled the pouring hole is plugged up, the pipe end F is then unscrewed and the thread D' thus left standing in the packing ring D and the coupling is ready to receive the tapered screw threaded end A' of the pipe A. The reason for pouring in the molten metal with the follower C screwed back a trifle, is to cause the tapered and threaded end A' of the pipe A to tighten first in the follower C and the packing ring D, and in screwing home the pipe the follower is caused to travel along on its other screw thread $C^2$, and at the same time revolve the threaded packing ring whereby, with a small amount of friction and a slight exertion on the part of the operator, the packing ring is powerfully compressed and packed into every pore and cavity of the surrounding parts of the pipe, elbow coupling and follower. As there are no unthreaded joints whatever the packing ring material cannot escape when compressed.

It is understood that the follower can at any time be screwed up against the packing ring by a wrench or other suitable tool.

As illustrated in Figs. 3 and 4, the end of the elbow coupling is recessed instead of the follower, but the above described mode of procedure and the result are precisely the same. In this case the coupling $B^4$ is formed with the threads $B^5$ and $B^6$ the packing ring $D^4$ with the threads $D^5$ and $D^6$ and the follower $C^4$ with the threads $C^5$ and $C^6$. The pipe $A^4$ to be coupled is provided with the thread $A^5$ screwing into the threads $C^5$, $D^5$ and $B^5$. The follower $C^4$ screws with its thread $C^6$ into the thread $B^6$ of the coupler $B^4$ and the exterior thread $D^6$ of the packing ring $D^4$ engages part of the thread $B^6$. By this special arrangement I am enabled to form a secure pipe coupling of the standard length, (three quarters of an inch,) of which one-third is on the elbow coupling, one-third on the packing ring and one-third on the follower.

Having thus fully described my invention, I claim as new and desire to secure by Letters Patent—

1. A pipe fitting comprising a coupling, a follower having a threaded connection with the said coupling and provided with a second thread adapted to be engaged by the pipe to be coupled, and a packing ring having an interior and exterior screw-thread and arranged between the coupling and follower so that the latter on being screwed up compresses the packing ring on the said coupling, and the pipe to be coupled, substantially as shown and described.

2. A pipe fitting comprising a pipe having a threaded end, a coupling having two threads of which one is engaged by part of the said pipe end, a recessed follower screwing on part of the said pipe and engaging the other coupling thread, and a packing ring screwing on the remaining intermediate part of the pipe end and also screwing on the said recessed follower, substantially as shown and described.

3. A pipe fitting comprising a coupling, a packing ring, and a follower for the said ring, the said coupling ring and follower having each two threads of different diameter, the connected follower and coupling presenting an internal thread to the external thread of the said ring, substantially as shown and described.

JOHN McINTYRE.

Witnesses:
THEO. G. HOSTER,
C. SEDWICK.